United States Patent
Ait-Haddou et al.

(10) Patent No.: US 9,855,534 B1
(45) Date of Patent: Jan. 2, 2018

(54) POROUS PTFE MEMBRANES FOR METAL REMOVAL

(71) Applicant: Pall Corporation, Port Washington, NY (US)

(72) Inventors: Hassan Ait-Haddou, Melville, NY (US); Khaled Abdel-Hakim Helmy Aamer, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 15/392,364

(22) Filed: Dec. 28, 2016

(51) Int. Cl.
| | |
|---|---|
| *B01D 71/36* | (2006.01) |
| *B01D 61/38* | (2006.01) |
| *B01D 61/14* | (2006.01) |
| *B01D 67/00* | (2006.01) |
| *B01D 71/80* | (2006.01) |
| *B01D 71/52* | (2006.01) |
| *B01D 69/12* | (2006.01) |
| *C09D 171/03* | (2006.01) |

(52) U.S. Cl.
CPC .............. *B01D 71/80* (2013.01); *B01D 61/14* (2013.01); *B01D 67/0093* (2013.01); *B01D 69/125* (2013.01); *B01D 71/36* (2013.01); *B01D 71/52* (2013.01); *C09D 171/03* (2013.01); *B01D 2323/30* (2013.01)

(58) Field of Classification Search
CPC ...... B01D 71/80; B01D 61/14; B01D 69/125; B01D 71/52; B01D 71/36; B01D 67/0093; B01D 2323/30; C09D 171/03
See application file for complete search history.

(56) References Cited

U.S. PATENT DOCUMENTS

| | | | | |
|---|---|---|---|---|
| 4,086,209 A | * | 4/1978 | Hara | ............ B01D 71/58 |
| | | | | 528/125 |
| 5,928,792 A | | 7/1999 | Moya | |
| 6,179,132 B1 | | 1/2001 | Moya | |

(Continued)

FOREIGN PATENT DOCUMENTS

| | | | |
|---|---|---|---|
| CN | 104371124 A | * | 2/2015 |
| WO | WO 2013/165602 A1 | | 11/2013 |

OTHER PUBLICATIONS

EIC Structure Search Aug. 2017.*
EIC Search Aug. 22 2017.*

*Primary Examiner* — Pamela H Weiss
(74) *Attorney, Agent, or Firm* — Leydig, Voit & Mayer, Ltd.

(57) ABSTRACT

Disclosed is a porous membrane comprising a porous polytetrafluoroethylene (PTFE) substrate and a coating comprising a copolymer of formula (I):

H—[—O—CH(Rf)—CH$_2$—]$_m$—[—O—CHM-CH$_2$—]$_n$—[—O—CHL-CH$_2$—]$_s$—OH (I), wherein Rf is perfluoro-substituted alkyl or perfluoro-substituted alkyloxy alkyl; M is —CH$_2$—O—(CH$_2$)$_3$—S—(CHZ)$_t$—Y, wherein Z is hydrogen or —CH$_2$COOH, and for example, Y is —COOH or —SO$_3$H, R is hydrogen or alkyl, L is —CH$_2$—O—CH$_2$—CH=CH$_2$, m and n are each independently from about 10 to about 1000, n:s ranges from 0.3:0.7 to 1:0, and t is 0 or 1. Also disclosed is a method of preparing the porous membrane and a method of filtering a fluid, such as isopropanol, containing dissolved metals at a low concentration by the use of such membrane.

21 Claims, 1 Drawing Sheet

(56) References Cited

U.S. PATENT DOCUMENTS

| | | | |
|---|---|---|---|
| 6,387,379 B1* | 5/2002 | Goldberg | A61F 2/0077 424/400 |
| 7,094,469 B2 | 8/2006 | Moya | |
| 7,112,363 B2 | 9/2006 | Moya | |
| 8,927,612 B2 | 1/2015 | Zhang et al. | |
| 9,017,899 B2* | 4/2015 | Zhang | B01D 69/10 429/492 |
| 9,630,151 B2* | 4/2017 | Aamer | B01D 71/26 |
| 9,636,641 B2* | 5/2017 | Aamer | B01D 67/0006 |
| 9,643,130 B2* | 5/2017 | Ait-Haddou | B01D 71/44 |
| 2001/0020063 A1* | 9/2001 | Kapeliouchko | C08F 2/26 524/801 |
| 2004/0099527 A1* | 5/2004 | Nakayama | C08L 27/12 204/296 |
| 2007/0102349 A1* | 5/2007 | Duong | B01D 67/0093 210/500.27 |
| 2009/0049988 A1* | 2/2009 | Meindl | B01D 53/228 95/285 |
| 2011/0017942 A1* | 1/2011 | Bivens | C09K 5/045 252/68 |
| 2014/0231340 A1* | 8/2014 | Gsell | B01D 67/0027 210/500.36 |
| 2015/0129496 A1* | 5/2015 | Sanguineti | B01D 69/12 210/640 |
| 2015/0144557 A1 | 5/2015 | Ly et al. | |
| 2015/0375181 A1* | 12/2015 | Ait-Haddou | B01D 71/32 210/500.41 |
| 2016/0144332 A1 | 5/2016 | Gjoka et al. | |
| 2016/0317982 A1 | 11/2016 | Stasiak et al. | |

\* cited by examiner

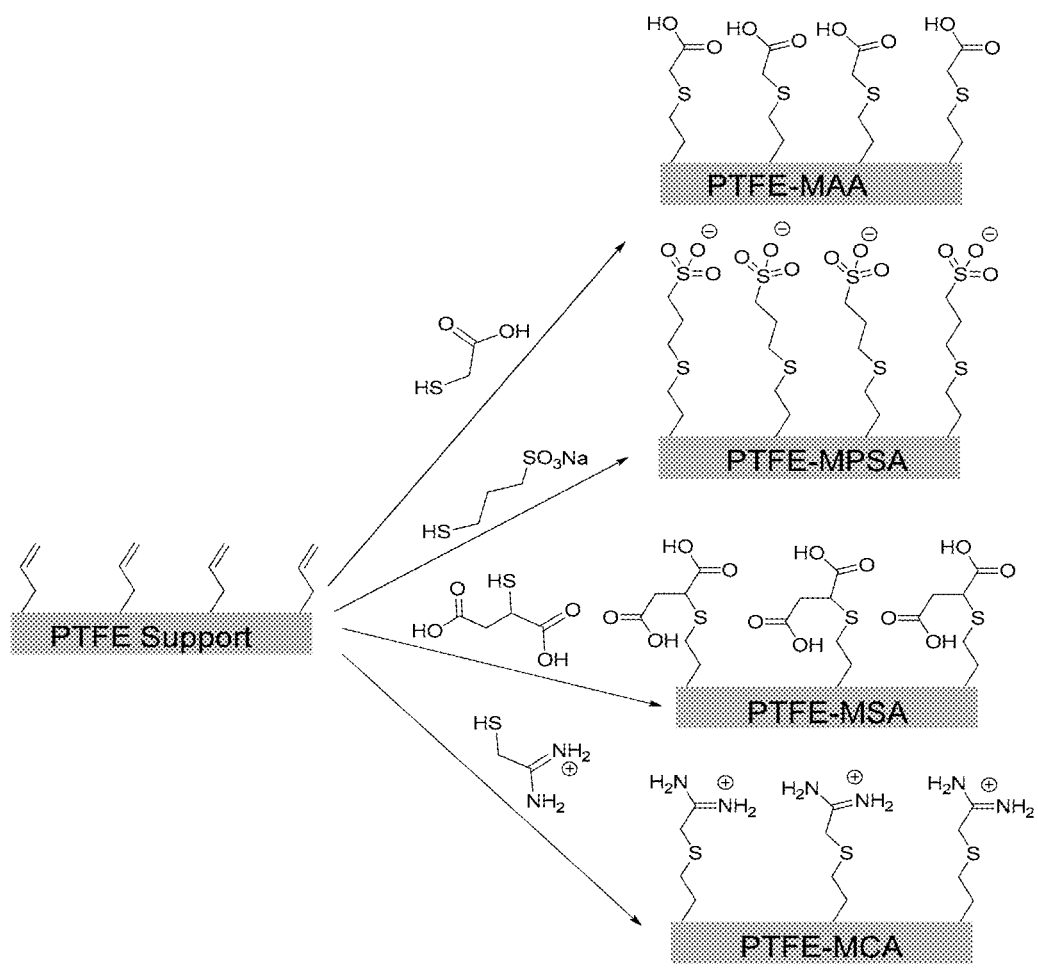

POROUS PTFE MEMBRANES FOR METAL REMOVAL

BACKGROUND OF THE INVENTION

Surface modified porous polytetrafluoroethylene (PTFE) membranes are being considered for filtering a variety of fluids, for example, for removing trace metal impurities from microelectronics fluids. Some of these membranes are characterized by low surface energy values or critical wetting surface tension (CWST) values and/or high resistance to organic solvents and aggressive chemicals. Despite the one or more of the advantages of these membranes, there exists a need for PTFE based membranes with improved properties such as low CWST values and/or increased resistance to organic solvents and/or aggressive chemicals.

BRIEF SUMMARY OF THE INVENTION

The invention provides a porous membrane comprising a porous polytetrafluoroethylene (PTFE) substrate and a coating comprising a copolymer of the formula: $H-[-O-CH(Rf)-CH_2-]_m-[-O-CHM-CH_2-]_n-[-O-CHL-CH_2-]_s-OH$ (I), wherein Rf is a perfluoro-substituted alkyl group or perfluoro-substituted alkyloxyalkyl group;

M is a group of the formula $-CH_2-O-(CH_2)_3-S-(CHZ)_t-Y$, wherein Z is hydrogen or $-CH_2COOH$, and Y is selected from the group consisting of COOH, $SO_3H$, phenyl-$SO_3H$, NHR, $NR_3^+$, pyridinyl, pyrimidinyl, pyrrolyl, pyrazolyl, triazolyl, pyrazinyl, tetrazole amidinyl, and guanidinyl, wherein R is selected from hydrogen, alkyl, aryl, and arylalkyl and combinations thereof;

L is a group of the formula $-CH_2-O-CH_2-CH=CH_2$;

m and n are each independently from about 10 to about 1000; the value of s is such that ratio n:s ranges from 0.3:0.7 to 1:0; and t is 0 or 1;

wherein the copolymer optionally further includes one or more repeat units of the formula: $-O-CHL'-CH_2-$, wherein L' is of the formula $-CH_2-O-CH_2-CH_2-CH_2-Q$, wherein Q is a positively charged group; and wherein the copolymer is optionally crosslinked.

The invention also provides a method of preparing a porous PTFE membrane comprising the copolymer disposed on a porous substrate followed by chemically modifying the coating. The invention further provides a method of filtering fluids, particularly microelectronics fluids. For example, the porous membranes are suitable for removing metal impurities present in fluids generated in microelectronics to a concentration below 1 ppb, preferably below 0.005 ppb, or below the detection limit of most instruments.

The porous PTFE membranes of the invention have one or functional groups having affinity for metals, for example, they are able to chelate the metals present in fluids, especially at low pH's such as 1-3. It is possible to remove the metals by washing with a suitable cleaning solution and reuse the porous membrane without loss or significant loss of performance. The porous membranes have high ion exchange capacity and stability of ion exchange capacity.

BRIEF DESCRIPTION OF THE DRAWING

FIG. 1 illustrates a method of preparing a porous PTFE membrane by post-modification of a porous PTFE substrate coated with a polymer having allyl groups in accordance with an embodiment of the invention.

DETAILED DESCRIPTION OF THE INVENTION

In accordance with an embodiment, the invention provides a porous membrane comprising a porous polytetrafluoroethylene (PTFE) substrate and a coating comprising a copolymer of formula (I):

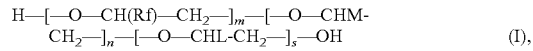
$H-[-O-CH(Rf)-CH_2-]_m-[-O-CHM-CH_2-]_n-[-O-CHL-CH_2-]_s-OH$ (I), wherein Rf is a perfluoro-substituted alkyl group or perfluoro-substituted alkoxyalkyl group;

M is a group of the formula $-CH_2-O-(CH_2)_3-S-(CHZ)_t-Y$, wherein Z is hydrogen or $-CH_2COOH$, and Y is selected from the group consisting of COOH, $SO_3H$, phenyl-$SO_3H$, NHR, $NR_3^+$, pyridinyl, pyrimidinyl, pyrrolyl, pyrazolyl, triazolyl, pyrazinyl, tetrazole amidinyl, and guanidinyl, wherein R is selected from hydrogen, alkyl, aryl, and arylalkyl and combinations thereof;

L is a group of the formula $-CH_2-O-CH_2-CH=CH_2$;

m and n are each independently from about 10 to about 1000; the value of s is such that ratio n:s ranges from 0.3:0.7 to 1:0; and t is 0 or 1;

wherein the copolymer optionally further includes one or more repeat units of the formula: $-O-CHL'-CH_2-$, wherein L' is of the formula $-CH_2-O-CH_2-CH_2-CH_2-Q$, wherein Q is a positively charged group; and wherein the copolymer is optionally crosslinked;

or a salt of the copolymer.

The copolymer could be a block copolymer or a random copolymer.

In an embodiment, m and n is independently from about 100 to about 800, about 200 to about 600, about 400 to about 800, about 500, or about 600.

In an embodiment, Y is selected from the group consisting of COOH, $SO_3H$, phenyl-$SO_3H$, NHR, and $NR_3^+$, wherein R is hydrogen or alkyl.

For example, the alkyl group R is $C_1$, $C_2$, $C_3$, $C_4$, $C_5$, or $C_6$ alkyl. The alkyl group can be linear or branched.

In any of the above embodiments, Rf is $C_pF_{2p+1}-(CH_2)_q(OCH_2)_r$, wherein p is 1 to 12, q is 0 to 3, and r is 0 to 2.

In any of the above embodiments, Rf is $C_6F_{13}(CH_2)_2OCH_2$ or $C_6F_{13}CH_2$.

In any of the above embodiments, the ratio n:s is 0.3:0.7, 0.4:0.6; 1:1, 1:5; 0.6:0.4; 0.7:0.3; 0.8:0.2; 0.9:0.1; or 1:0.

In any of the embodiments, alkyl or alkyloxy group can have 1-12 carbon atoms, e.g., 1, 2, 3, 4, 5, or 6 carbon atoms. The alkyl or alkyloxy group can be linear or branched.

The coating comprising the copolymer of formula (I) can be prepared from a precursor copolymer of formula $H-[-CH(Rf)-CH_2-]_m-[-O-CHL-CH_2-]_s-OH$ (II), wherein Rf and L are as defined above; m and s are each independently from about 10 to about 1000; wherein the copolymer optionally further includes one or more repeat units of the formula: $-O-CHL-CH_2-$, wherein L' is of the formula $-CH_2-O-CH_2-CH_2-CH_2-Q$, wherein Q is a positively charged group. The copolymer of formula (II) can be a block copolymer or a random copolymer.

In an embodiment, where the copolymer of formula (II) is a block copolymer, it can be prepared by a process involving sequential polymerization of epoxide monomers by ring opening polymerization. Thus, a ring opening polymerization of a first epoxide monomer having the desired Rf group as a substituent on the epoxy ring is carried out, followed by carrying out another ring opening polymerization of a second epoxide monomer with a an allyl group, for example, an alkyl substituted allyl group.

For example, a mixture containing an epoxide monomer bearing a suitable substituent can be polymerized by the use of a trialkylaluminum and an initiator salt having a halogen anion and an organic cation as a counterion. The organic cation in the salt having an organic cation as a counter cation is preferably an ammonium ion or a phosphonium ion, such as bis(triarylphosphoranylidene)ammonium ion, bis(trialkylphosphoranylidene)ammonium ion, and triarylalkylphosphonium ion, as described, for example, in US 2009/0030175 A1, paragraphs [0024] to [0029]. An example of triarylalkylphosphonium ion is $[MePPh_3]^+$, wherein Me is methyl. Illustratively, a homopolymer of a first monomer, an epoxide substituted with a suitable Rf group, can first be produced, and a second monomer having a substituted epoxide such as allyl glycidyl ether can be added and the polymerization continued to obtain a precursor block copolymer of formula (II).

In another embodiment, where the copolymer of formula (II) is a random copolymer, such a copolymer can be prepared by a process involving polymerization of a mixture of the epoxide monomer having the desired Rf group as substituent and allyl glycidyl ether by ring opening polymerization.

Either of the polymerization processes above is conducted in a suitable solvent or mixture of solvents, for example, solvents generally used for conducting cationic ring opening polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer(s) concentration in the solvent or mixture of solvents can be in the range of about 1 to about 50 wt %, preferably about 2 to about 45 wt %, and more preferably about 3 to about 40 wt %.

The polymerization can be carried out at any suitable temperature, for example, from about −20 to about +100° C., preferably about 20 to about 100° C.

The polymerization can be carried out for any length of time suitable to obtain the appropriate chain length of each of the blocks, which can be from about 1 minute to about 100 hours.

The number average molecular weight of the precursor block copolymer is about 10 KDa to about 400 KDa, particularly 50 KDa to about 200 KDa, and more particularly about 150 KDa. The polydispersity index (Mw/Mn) can be at any suitable range, e.g., 1.1 to 3.0, preferably 1.1 to 2.5.

The precursor copolymers can be isolated by a suitable technique, for example, precipitation with a nonsolvent or by the concentration of the suitably quenched reaction mixture.

The precursor copolymers can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The precursor copolymer (II) could contain quaternary groups by the reaction of the allyl groups with the cationic initiator used in the ring opening polymerization.

The present invention provides a method of preparing a porous membrane comprising a porous PTFE substrate and a coating comprising a copolymer of formula (I):

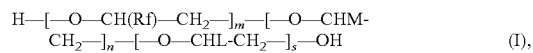

$$H—[—O—CH(Rf)—CH_2—]_m—[—O—CHM-CH_2—]_n—[—O—CHL-CH_2—]_s—OH \quad (I),$$

wherein Rf is a perfluoro-substituted alkyl group or a perfluoro-substituted alkyloxyalkyl group;

M is a group of the formula $—CH_2—O—(CH_2)_3—S—(CHZ)_t—Y$, wherein Z is hydrogen or $—CH_2COOH$, and Y is selected from the group consisting of COOH, $SO_3H$, phenyl-$SO_3H$, NHR, $NR_3^+$, pyridinyl, pyrimidinyl, pyrrolyl, pyrazolyl, triazolyl, pyrazinyl, tetrazole amidinyl, and guanidinyl, wherein R is selected from hydrogen, alkyl, aryl, and arylalkyl and combinations thereof;

L is $—CH_2—O—CH_2—CH=CH—B$, wherein B is H or a divalent C—C bond forming a crosslinked network;

m and n are each independently from about 10 to about 1000; the value of s is such that ratio n:s ranges from 0.3:0.7 to 1:0; and t is 0 or 1;

the copolymer optionally comprising one or more repeat units of the formula: $—O—CHL'-CH_2—$, wherein L' is of the formula $—CH_2—O—CH_2—CH_2—CH_2-Q$, wherein Q is a positively charged group;

the method comprising:

(i) providing a porous PTFE substrate;

(ii) coating the porous PTFE substrate with a solution comprising a solvent and the copolymer described above of formula (II):

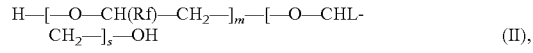

$$H—[—O—CH(Rf)—CH_2—]_m—[—O—CHL-CH_2—]_s—OH \quad (II),$$

wherein Rf and L are as defined above; m and s are each independently from about 10 to about 1000;

wherein the copolymer optionally further includes one or more repeat units of the formula: $—O—CHL'-CH_2—$, wherein L' is of the formula $—CH_2—O—CH_2—CH_2—CH_2-Q$, wherein Q is a positively charged group;

(iii) drying the coated porous PTFE substrate from (ii) to remove at least some, preferably all, of the solvent from the coating comprising a solvent and the copolymer; and (iv) reacting the coated porous PTFE substrate from (iii) with a reagent of formula: $HS—(CHZ)_t—Y$ (III), wherein Z, t, and Y are as defined above.

In an embodiment of the above copolymer (II), m and s can be independently from about 100 to about 800, about 200 to about 600, about 400 to about 800, about 500, or about 600.

In accordance with the invention, to prepare a porous PTFE membrane, a porous PTFE substrate, for example, one having a pore diameter of 10 nm to 1000 μm, particularly, from 100 nm to 100 μm, is coated with a solution of the precursor copolymer. The solution can contain about 1 to about 10 w/v % of the precursor copolymer and a suitable solvent or mixture of solvents. Examples of suitable solvents include halogenated, in particular fluorinated solvents, such as Novec 7100 (methoxy-nonafluorobutane), 7200DL (ethoxy-nonafluorobutane), 72DE (blend of methyl nonafluorobutylether, ethyl nonafluorobutyl ether and trans-1,2-dichloroethylene), and 71IPA (blend of ethoxy-nonafluorobutane and isopropanol), chlorinated solvents such as chlorobenzene, chloroform, dichloromethane, and/or non-halogenated solvents such as acetone and toluene, or mixtures thereof. The porous PTFE substrate is soaked for a suitable length of time, e.g., about 1 to about 10 minutes, in the polymer solution, and the coated substrate is dried, e.g., by air drying, to remove the solvent(s). The resulting coated substrate has a weight gain of about 4 about 20 wt % due to the precursor copolymer coating, has a CWST of about 40 to about 50 dynes/cm$^2$, and is not wettable by water.

In accordance with an embodiment of the invention, the precursor copolymer present in the coated substrate is modified by a thiol-ene reaction of the pendant allyl moieties (of L) with suitable thiol-containing reagents according to procedures known to those skilled in the art. In accordance with an embodiment, suitable thiol-containing reagents include sodium 3-mecapto propane sulfonate (MPSA), mercaptoacetic acid (MAA), mercaptosuccinic acid (MSA), and 2-sulfanylethanimidamide (MCA). Embodiments of such modification reactions are illustrated in FIG. 1. Thus, for example, a coated substrate is pre-wet with IPA, and contacted with a solution containing 10% by weight of sodium mercaptopropyl sulfate (SMPSA) in the presence of 5% of a free radical initiator in deionized water at a suitable temperature, e.g., 30-90° C., particularly at 85° C., for a suitable period of time, e.g., 0.1 to 12 hours, particularly 6 hours. The modified membrane is then flushed with deionized water, soaked in 3% HCl solution for 2 hours, flushed again with deionized water, and finally flushed by IPA and dried.

Any suitable free radical initiator, solvent or water soluble, particularly water soluble, can be used during the thiol-ene reaction. Examples of useful free radical initiators include 2,2'-Azobis(2-methylpropionitrile) (AIBN), 2,2'-Azobis(2-methylpropionamidine) dihydrochloride, 2,2'-Azobis(4-methoxy-2,4-dimethyl valeronitrile), 2,2'-Azobis[2-(2-imidazolin-2-yl)propane]dihydrochloride, 2,2'-Azobis[N-(2-carboxyethyl)-2-methylpropionamidine]hydrate, 2,2'-Azobis[2-(2-imidazolin-2-yl)propane], 2,2'-Azobis[2-methyl-N-(2-hydroxyethyl)propionamide], 2,2'-Azobis(2,4-dimethyl valeronitrile), 1,1'-Azobis(cyclohexane-1-carbonitrile), and 2,2'-Azobis(2-methylbutyronitrile).

CWST can be measured by a suitable method. In an embodiment, the method relies on a set of solutions of certain composition. Each solution has specific surface tension. The solutions surface tension ranges from 15 to 92 dyne/cm in small non-equivalent increments. To measure membrane surface tension, it is positioned on top of a white light table, one drop of a solution of certain surface tension is applied to the porous membrane surface and the time the drop takes to penetrate through the porous membrane and become bright white as an indication of light going through the porous membrane is recorded. Instant wetting is considered when the time the drop takes to penetrate the porous membrane is <10 seconds. If the time >10 seconds, the solution is considered to partially wet the porous membrane.

The coating of the precursor copolymer of formula (II) on the porous PTFE substrate followed by drying can result in a crosslinked copolymer of formula (I) as a result of reaction of the residual allyl groups (unmodified during the thiol-ene reaction) present on copolymer with one another.

In accordance with an embodiment of the invention, the porous PTFE membrane is a nanoporous membrane, for example, a porous membrane having pores of diameter between 1 nm and 100 nm, or a microporous membrane having pores of diameter between 0.1 µm and 10 µm.

The present invention further provides a method of filtering a fluid, the method comprising passing the fluid through any of the embodiments of the porous membrane above. The fluid can be an aqueous fluid, an organic fluid, or a combination thereof.

The present invention provides, for example, a method of filtering a fluid, the method comprising passing the fluid through any of the embodiments of porous membranes described above. For example, trace metal impurities continue to pose a problem in the manufacture of next generation semiconductor and microelectronics materials. One embodiment of the invention comprises a method of removing dissolved metals from a fluid, particularly a microelectronics fluid, by passing the metal-containing fluid through a porous membrane including the copolymer and removing the metals from the fluid. In one embodiment, the inventive method includes passing the metal-containing fluid through a porous membrane and removing the metals from the fluid. The membrane can remove about 99% of most trace metals from the fluid.

Thus, for example, the porous PTFE membrane can be used to remove trace metals such as Li, Na, K (and other Group 1 metals); Mg, Ca (and other Group 2 metals); Al (and other Group 3 metals), Pb (and other Group 4 metals), Sb, Bi (and other Group 5 metals), and Cd, Cr, Mo, Pd, Ag, W, V, Mn, Fe, Ni, Cu, Zn (and other Transition metals) from water and organic fluids in many applications, such as, e.g., those in the microelectronics industry, for example, down to a level of 0.005 ppb or to the detection limit of the instrument.

In accordance with an embodiment, the contaminant removed from fluids is one or more metals of Groups 1-5 of the periodic table, one or more transition metals, or any combination thereof, for example, the contaminant is selected from the group consisting of Li, Na, K, Mg, Ca, Al, Pb, Sb, Bi, Cd, Cr, Mo, Pd, Ag, W, V, Mn, Fe, Ni, Cu, and Zn, and any combination thereof.

In accordance with embodiments of the invention, the porous PTFE membrane can have a variety of configurations, including planar, flat sheet, pleated, tubular, spiral, and hollow fiber. In one embodiment, the porous membrane is a hollow-fiber membrane.

The porous PTFE membrane according to embodiments of the invention is typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The porous PTFE membrane, according to embodiments of the invention, can also be used in a variety of other applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and filtering hot sulfuric peri-oxide mixture (SPM) fluids), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, the porous PTFE membrane according to embodiments of the invention can be used to filter air and/or gas and/or can be used for venting applications (e.g., allowing air and/or gas, but not liquid, to pass therethrough). Porous PTFE membrane according to embodiments of the inventions can be used in a variety of devices, including surgical devices and products, such as, for example, ophthalmic surgical products.

The following examples further illustrate the invention but, of course, should not be construed as in any way limiting its scope.

Example 1

This example illustrates the preparation and performance of a porous PTFE membrane in accordance with an embodiment of the invention starting from a block copolymer of allyl glycidyl ether and 3-[2-(perfluorohexyl)ethoxy]-1,2-epoxypropane.

A 0.2 micron porous PTFE substrate was coated with the copolymer solution (1.5% by weight) in acetone. The coated substrate was pre-wet in IPA followed by DIW exchange and then reacted in a solution containing 10% by weight of mercaptopropyl sulfonate sodium salt (MPSA) in the presence of 5% of initiator 2,2'-Azobis(2-methylpropionami-dine)dihydrochloride in deionized water at 85° C. for 6 hours. The modified membrane was then flushed by deionized water, soaked in 3% HCl solution for 2 hours, flushed with deionized water again and finally flushed by IPA and dried.

Prior to testing the membrane for metal removal from IPA, all of the test equipment were soaked in 3% HCl for 24 hours and flushed with deionized water. Three 47 mm disks were cut to be tested from each of the flat sheet media samples. Each disk was placed in the filter housing in order to be challenged. Each sample was flushed sequentially with 100-200 mL of IPA, followed by 100-200 mL of 5% HCl, and finally with 200-500 mL of deionized water. Each sample was then challenged with IPA spiked with 1 ppb of each metal in the form of metal salts, e.g., hydroxide, chloride, or nitrate. An effluent flow rate of 7 mL/min was established. 10 mL of effluent was collected into PFA bottles. Influent and all effluent samples were collected for ICP-MS analysis.

Additional microporous membranes were made following the same procedure except the thiol-containing reagent was varied as illustrated in FIG. 1.

The metal removal performance from IPA solvent is set forth in Table 1 below:

TABLE 1

| Metal | ICP-MS Results (ppb) | | | | |
|---|---|---|---|---|---|
| | Influent | MSA | MAA | MCA | MPSA |
| Li | 0.96 | <0.005 | 0.45 | 0.9 | <0.05 |
| Na | 1.39 | 0.5 | 0.6 | 0.85 | <0.05 |
| Mg | 1.02 | 0.04 | <0.05 | 0.65 | <0.05 |
| Al | 1.01 | 0.06 | <0.05 | 0.5 | <0.05 |
| K | 1.13 | 0.3 | 1.01 | 0.87 | <0.05 |
| Ca | 0.99 | 0.4 | 0.6 | 0.68 | <0.05 |
| Cr | 0.98 | 0.85 | 0.09 | 0.3 | 0.31 |
| Mn | 0.98 | <0.05 | <0.05 | 0.65 | <0.05 |
| Fe | 0.95 | 0.8 | 1.1 | 1.2 | <0.05 |
| Ni | 0.98 | 0.06 | 0.67 | 1.01 | <0.05 |
| Cu | 0.99 | 0.08 | 0.05 | 0.45 | <0.05 |
| Zn | 0.99 | 0.86 | 0.62 | 0.56 | <0.05 |
| Mo | 0.98 | <0.05 | 0.82 | 0.78 | 0.06 |
| Pb | 0.92 | <0.05 | <0.05 | <0.05 | <0.05 |

Example 2

This example illustrates the preparation and performance properties of a porous membrane according to another embodiment of the invention.

A random copolymer of formula (II) was prepared as follows.

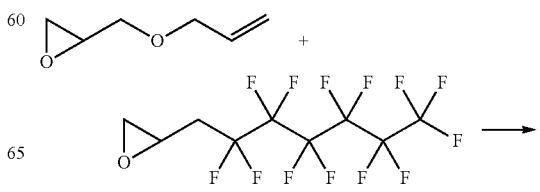

-continued

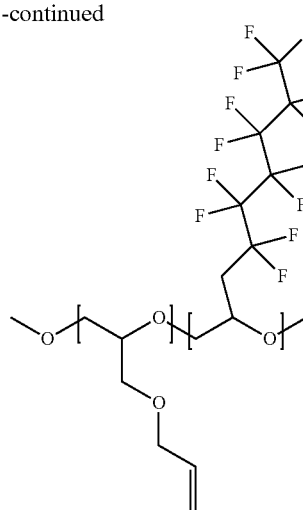

A 2.0 L Schlenk flask equipped with a magnetic stirring bar was charged with MePPh3Br as solid (1.15 g, 3.22 mmol), under dry conditions and under nitrogen or argon. Anhydrous toluene (750 mL) was transferred under nitrogen followed by the transfer of allyl glycidol ether (147.1 g, 1.29 mol) and 3-(perfluorohexyl)propylene oxide (242.2 g, 6.44 mol) under Argon and the reaction flask was cooled down to 0-5° C. before triisobutylaluminium (32.2 mmol, 29.27 ml) was transferred in one portion to the flask containing the monomer mixture to start the polymerization. The reaction was maintained at 0-5° C. for 24 h before the mixture was quenched by adding MeOH/water mixture (4:1, 5.0 ml). The polymerization mixture was added to a mixing container containing 2.5 L of MeOH/water mixture (4:1) and the mixture was allowed to settle to yield a white gel material at the bottom. The liquid part was decanted, and the remaining filtered to isolate the white gel material form solution. The white gel material was dissolved in acetone (4-5 L) and filtered through a bed of Celite (3-5 cm height, 8-10 cm diameter), followed by the removal of the acetone in a rotatory evaporator to yield the copolymer as a white viscous gel (325 g, 83% yield). The molecular weight of the copolymer was ~25 Kd as determined by GPC. The ratio of m:n was found to be about 400:about 200.

The above copolymer was coated on a porous PTFE substrate and modified with MPSA to obtain a porous membrane, as illustrated in Example 1, and tested for metal removal from IPA. The porous membrane substantially reduced the concentration of metal ions in the fluid as compared to a native PTFE membrane, as shown in Table 2.

TABLE 2

Metal removal performance from IPA: ICP-MS Results (ppb)

| Metal | Influent | Native PTFE 0.2 micron Effluent | Polymer E Effluent | Polymer E Effluent |
|---|---|---|---|---|
| Li | 1.3 | 1.18 | 0.1 | 0.18 |
| Na | 2.4 | 8.54 | 0.05 | 0.06 |
| Mg | 1.0 | 0.88 | <0.05 | 0.09 |
| Al | 1.1 | 2.03 | <0.05 | 0.04 |
| K | 1.2 | 5.49 | <0.05 | 0.1 |
| Ca | 1.2 | 12.2 | 0.10 | 0.06 |
| Cr | 0.7 | 0.25 | 0.09 | 0.17 |
| Mn | 1.2 | 0.73 | <0.05 | <0.05 |
| Fe | 0.8 | 0.46 | 0.1 | 0.08 |

TABLE 2-continued

Metal removal performance from IPA: ICP-MS Results (ppb)

| Metal | Influent | Native PTFE 0.2 micron Effluent | Polymer E Effluent | Polymer E Effluent |
|---|---|---|---|---|
| Ni | 1.2 | 0.71 | 0.07 | <0.05 |
| Cu | 1.1 | 0.71 | 0.05 | 0.06 |
| Zn | 1.2 | 2.23 | 0.1 | 0.52 |
| Mo | 1.2 | 0.79 | 0.82 | 0.50 |
| Pb | 1.2 | 0.88 | <0.05 | <0.05 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous membrane comprising a porous polytetrafluoroethylene (PTFE) substrate and a coating comprising a copolymer of formula (I):

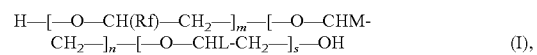

wherein Rf is a perfluoro-substituted alkyl group or a perfluoro-substituted alkyloxyalkyl group;

M is a group of the formula —$CH_2$—O—$(CH_2)_3$—S—$(CHZ)_t$—Y, wherein Z is hydrogen or —$CH_2COOH$, and Y is selected from the group consisting of COOH, $SO_3H$, phenyl-$SO_3H$, NHR, $NR_3^+$, pyridinyl, pyrimidinyl, pyrrolyl, pyrazolyl, triazolyl, pyrazinyl, tetrazole amidinyl, and guanidinyl, wherein R is selected from hydrogen, alkyl, aryl, and arylalkyl and combinations thereof;

L is a group of the formula —$CH_2$—O—$CH_2$—CH=$CH_2$;

m and n are each independently from about 10 to about 1000; the value of s is such that ratio n:s ranges from 0.3:0.7 to 1:0; and t is 0 or 1;

or a salt of the copolymer.

2. The porous membrane of claim 1, wherein Y is selected from the group consisting of COOH, $SO_3H$, phenyl-$SO_3H$, NHR, and $NR_3^+$, wherein R is hydrogen or alkyl.

3. The porous membrane of claim 1, wherein Rf is $C_pF_{2p+1}$—$(CH_2)_q(OCH_2)_r$, wherein p is 1 to 12, q is 0 to 3, and r is 0 to 2.

4. The porous membrane of claim 1, wherein the ratio n:s is 0.3:0.7.

5. The porous membrane of claim 1, wherein the ratio n:s is 1:1.

6. The porous membrane of claim 1, wherein the ratio n:s is 1:0.

7. The porous membrane of claim 1, wherein Rf is $C_6F_{13}(CH_2)_2OCH_2$— or $C_6F_{13}CH_2$—.

8. The porous membrane of claim 1, wherein the copolymer of formula (I) is a block copolymer.

9. The porous membrane of claim 1, wherein the copolymer of formula (I) is a random copolymer.

10. A method of preparing the porous membrane according to claim 1, the method comprising:
(i) providing a porous PTFE substrate;
(ii) coating the porous PTFE substrate with a solution comprising a solvent and a copolymer of formula (II):

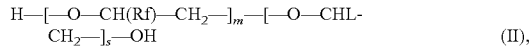

H—[—O—CH(Rf)—$CH_2$—]$_m$—[—O—CHL-$CH_2$—]$_s$—OH (II), wherein Rf and L are as defined above; m and s are each independently from about 10 to about 1000;

(iii) drying the coated porous PTFE substrate from (ii) to remove at least some of the solvent from the coating comprising a solvent and the copolymer; and (iv) reacting the porous coated PTFE substrate from (iii) with a reagent of formula (III): HS—$(CHZ)_t$—Y (III), wherein Z, t, and Y are as defined in claim 1.

11. The method of claim 10, wherein Y is selected from the group consisting of COOH, $SO_3H$, phenyl-$SO_3H$, NHR, and $NR_3^+$, wherein R is hydrogen or alkyl.

12. The method of claim 10, wherein Rf is $C_pF_{2p+1}$—$(CH_2)_q(OCH_2)_r$, wherein p is 1 to 12, q is 0 to 3, and r is 0 to 2.

13. The method of claim 10, wherein Rf is $C_6F_{13}(CH_2)_2OCH_2$ or $C_6F_{13}CH_2$.

14. The method of claim 10, wherein the copolymer of formula (II) is a block copolymer.

15. The method of claim 10, wherein the copolymer of formula (II) is a random copolymer.

16. A method of filtering a fluid containing a contaminant, the method comprising passing the fluid through the porous membrane of claim 1.

17. The method of claim 16, wherein the fluid is an aqueous fluid, an organic fluid, or a combination thereof.

18. The method of claim 16, wherein the contaminant is one or more metals of Groups 1-5 of the periodic table, one or more transition metals, or any combination thereof.

19. The method of claim 16, wherein the contaminant is selected from the group consisting of Li, Na, K, Mg, Ca, Al, Pb, Sb, Bi, Cd, Cr, Mo, Pd, Ag, W, V, Mn, Fe, Ni, Cu, and Zn, and any combination thereof.

20. The porous membrane of claim 1, wherein the copolymer further includes one or more repeat units of the formula: —O—CHL'-$CH_2$—, wherein L' is of the formula —$CH_2$—O—$CH_2$—$CH_2$—$CH_2$-Q, wherein Q is a positively charged group.

21. The porous membrane of claim 1, wherein the copolymer is optionally crosslinked.

* * * * *